(12) United States Patent
Ogino

(10) Patent No.: US 6,268,928 B1
(45) Date of Patent: *Jul. 31, 2001

(54) PRINTER

(75) Inventor: Tetsuro Ogino, Shizuoka (JP)

(73) Assignee: Star Micronics Co., Ltd., Shizuoka-shi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,222

(22) Filed: Jul. 16, 1998

(30) Foreign Application Priority Data

Jul. 26, 1997 (JP) .................................. P9-215926

(51) Int. Cl.[7] ....................................... G06F 15/00
(52) U.S. Cl. .................... 358/1.15; 358/1.14; 358/1.13
(58) Field of Search ................................ 358/1.15, 1.14, 358/1.13

(56) References Cited

U.S. PATENT DOCUMENTS

| | | | |
|---|---|---|---|
| 5,113,494 | * 5/1992 | Menendez et al. | 395/163 |
| 5,390,031 | * 2/1995 | Kang et al. | 358/468 |
| 5,528,765 | 6/1996 | Milligan | 395/287 |
| 5,696,600 | * 12/1997 | Perkins | 358/442 |
| 5,953,340 | * 9/1999 | Scott et al. | 370/401 |
| 6,047,319 | * 4/2000 | Olson | 709/223 |

FOREIGN PATENT DOCUMENTS

| | | | |
|---|---|---|---|
| 0 654 767 | 5/1995 | (EP) | G07G/1/14 |
| 8-123640 | 5/1996 | (JP) | G06F/3/12 |

* cited by examiner

Primary Examiner—Joseph Mancuso
Assistant Examiner—Douglas Tran
(74) Attorney, Agent, or Firm—Wenderoth, Lind & Ponack, L.L.P.

(57) ABSTRACT

A Printer includes an interface for exchanging signals with an external host, an interface for exchanging signals with a peripheral device, a station for printing a recording medium based on print data supplied by the external host, and a CPU for performing an output through operation to transmit data received from the external host via interface to the peripheral device via interface, and an input through operation to transmit data received from the peripheral device via interface to the external host via interface. This construction allows connection of a larger number of peripheral devices than the number of connection ports of the external host.

4 Claims, 5 Drawing Sheets

PRINTER

BACKGROUND OF THE INVENTION

1. Field of the Invention

The present invention relates to a printer having two or more interfaces, and more particularly to a printer connected to an external host device having a plurality of peripheral devices.

2. Description of the Related Art

In department stores, supermarkets, hotels and the like, POS (point of sale) systems for sales management are installed at cash counters where goods and cash are handled and settled. A POS system usually includes one host device, and a plurality of peripheral devices connected thereto, such as a printer, a bar-code reader and a magnetic card reader.

A recent trend has been toward increased types of peripheral devices to cope with diversified data input and data output methods for handling product codes and credit numbers. This requires an increase in the number of interface terminals mounted in the host device.

FIG. 6 is a block diagram showing one example of conventional POS systems. One of a variety of commercially available personal computers is often used as a host device H in order to save cost. The personal computer usually has one or two serial ports, and one parallel port. Thus, a maximum of three peripheral devices, i. e. devices Q1 and Q2 and a printer P, may be connected to the host device H. The host device H lacks a connection port for connecting a fourth peripheral device Q3 or more peripheral devices.

For connecting more peripheral devices than the number of ports of the host device H, an expansion board must be added to the host devices H to provide an increased number of ports. However, not only the cost of the expansion board itself, but a complex control program is required for controlling the expansion board. This results in an increase in the cost and an extended period for development of the entire POS system.

A scanner/printer connectable to a computer is known, in which an optical scanner and a printer are integrated to provide a fax function and a copying mechanism. However, this is a stand-alone type with a particular scanner mounted in a printer, and has no expandability for connecting other peripheral devices.

Japanese Unexamined Patent Publication JP-A8-123640 (1996) describes a connection switch mechanism provided between a host device having only one interface and a plurality of printing devices, for distributing signals by switch circuits on signal lines. This mechanism requires a complicated and costly switching circuit for switching a data bus and a control bus having a plurality of signal lines. Moreover, the mechanism is applicable only to parallel communication based on a busy signal.

SUMMARY OF THE INVENTION

An object of the present invention is to provide a printer for enabling connection of a larger number of devices than the number of connection ports of an external host device.

The invention provides a printer comprising:

a first interface for exchanging signals with an external host device;

a second interface for exchanging signals with a peripheral device;

a printing station for printing a recording medium based on print data supplied by the external host device; and a signal processing circuit for performing an output through operation to transmit data received from the external host device via the first interface, to the peripheral device via the second interface, and an input through operation to transmit data received from the peripheral device via the second interface, to the external host device via the first interface.

According to the invention, data received from the external host device may be transmitted to the peripheral device in the output through operation. Data received from the peripheral device may be transmitted to the external host device in the input through operation. Thus, data communication between the external host device and peripheral device, and data communication between the external host device and printer, may be effected via the first interface. Only one interface connection port is adequate for the external host device. It is therefore possible to connect a larger number of peripheral devices(including a printer) than the number of connection ports of the external host device.

In the invention, it is preferable that a first protocol of the first interface and a second protocol of the second interface are different from each other.

According to the invention, the first protocol is converted to the second protocol for the output through operation and the second protocol is converted to the first protocol for the input through operation. Thus, data communication may be effected between the external host device and peripheral device even where the protocol with the external host device and the protocol with the peripheral device are different from each other. A protocol means a condition for uniquely defining a command system, communicating conditions (communication rate, data length, parity and so on), type of interface (serial communication, parallel communication, Ethernet or the like), and a communications protocol (DTR mode, Xon/Xoff mode, STX-ETX mode, network protocol or the like).

With the protocol conversion effected by the printer, the external host device may be operable on only one protocol in realizing data communication with a plurality of devices (including the printer) having varied protocols. This reduces the load of the external host device. Moreover, data communication can be made with peripheral devices having protocols with which the external host device cannot cope, resulting in high expandability of peripheral interfaces.

In the invention, it is preferable that the first protocol and the second protocol conform to a serial interface standard.

According to the invention, the protocol conversion between the external host device and various peripheral devices becomes more effective since a serial interface standard requires setting of various conditions such as number of signal lines, synchronous or asynchronous, baud rate, data length, with or without a parity bit, odd number parity or even number parity, stop bit length, flow control method and so on.

BRIEF DESCRIPTION OF THE DRAWINGS

These and further objects, features, and advantages of the invention will be more explicit from the following detailed description taken with reference to the drawings wherein:

FIG. 3 is a flow chart of an initializing process carried out after power is turned on;

DETAILED DESCRIPTION OF THE PREFERRED EMBODIMENTS

Figure 1:
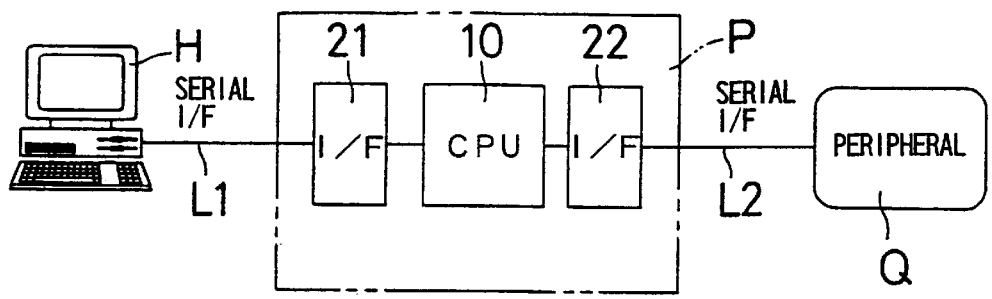
FIG. 1 is a block diagram showing one example of connection between a printer according to the invention and an external host.

Now referring to the drawings, preferred embodiments of the invention are described below.

FIG. 1 is a block diagram showing one example of a connection between a printer according to the invention and an external host. An external host H in the form of a personal computer or the like, and a peripheral device Q, such as a bar-code reader, a magnetic card reader or an additional printer, have connectors for serial interfaces such as RS-232C.

A printer P includes an interface 21 for exchanging signals with the external host H, an interface 22 for exchanging signals with the peripheral device Q, a CPU (central processing unit) 10 for processing signals, and a printing unit (not shown) for printing a recording medium based on print data supplied by the external host H. The interfaces 21 and 22 also have connectors for serial interfaces such as RS-232C, and are connected to the external host H and peripheral device Q through signal cables L1 and L2, respectively.

The CPU 10 is disposed between the interfaces 21 and 22, and has operating modes including a print mode, an output through mode and an input through mode. In the print mode, the CPU 10 executes a predetermined signal processing (including code interpretation, dot developing and the like) of the print data supplied by the external host H, and prints the data at the printing unit. In the output through mode, the CPU 10 receives data transmitted from the external host H via the interface 21, and transmits the data to the peripheral device Q via the interface 22. In the input through mode, the CPU 10 receives data transmitted from the peripheral device Q via the interface 22, and transmits the data to the external host H via the interface 21.

With the above construction, the external host H can exchange data with the printer P and peripheral device Q through the interface 21. It is adequate for the external host H to have only one interface connection port. The external host H can be connected with the devices (including the printer) greater in number than the connection port of the external host H.

The construction shown in FIG. 1 exemplifies the interface 21 connected to the host H and the interface 22 connected to the peripheral device Q both conforming to a serial interface standard. It is also possible a) that the interface 21 is based on a serial interface standard while the interface 22 is based on a parallel interface standard, b) that the interface 21 is based on a parallel interface standard while the interface 22 is based on a serial interface standard, and c) that both interfaces 21 and 21 are based on a parallel interface standard. Further, one or both of the interfaces 21 and 22 may be based on various protocols such as Ethernet. Where the interfaces 21 and 22 differ in protocol, the printer P has a function to convert the protocols, thereby to increase expandability of the interfaces.

Figure 2:
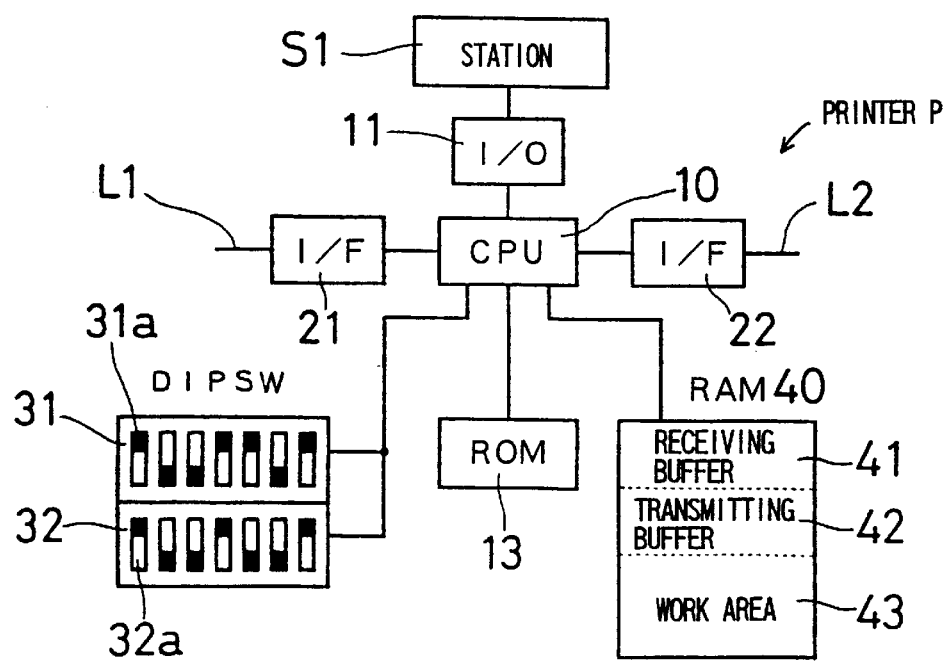
FIG. 2 is a block diagram showing an electrical construction of the printer P according to the invention.

FIG. 2 is a block diagram showing an electrical construction of the printer P according to the invention. Here, the printer P has a station S1 including a mechanism for printing data on receipts or slips of paper, for example.

The printer P includes the two interfaces 21 and 22, the CPU 10, the station S1 acting as the printing unit, dip switches (DIPSW) 31 and 32 for effecting an initialization when power is turned on, a nonvolatile ROM (read-only memory) 13 for storing various data such as fonts and programs, and a volatile RAM (random-access memory) 40 for storing data.

The interfaces 21 and 22 conform to a predetermined interface standard such as for serial interfaces or parallel interfaces, and are connected to the external host H and peripheral device Q through signal cables L1 and L2, respectively.

The station S1 is connected to CPU 10 through an input/output circuit (I/O) 11, and includes a receipt printer mechanism or a slip printer mechanism.

The RAM 40 has a receiving buffer 41 for storing data received from the interfaces 21 and 22, a transmitting buffer 42 for storing data to be transmitted to the interfaces 21 and 22, and a work area 43 for the CPU 10 to process signals therein.

Figure 3:
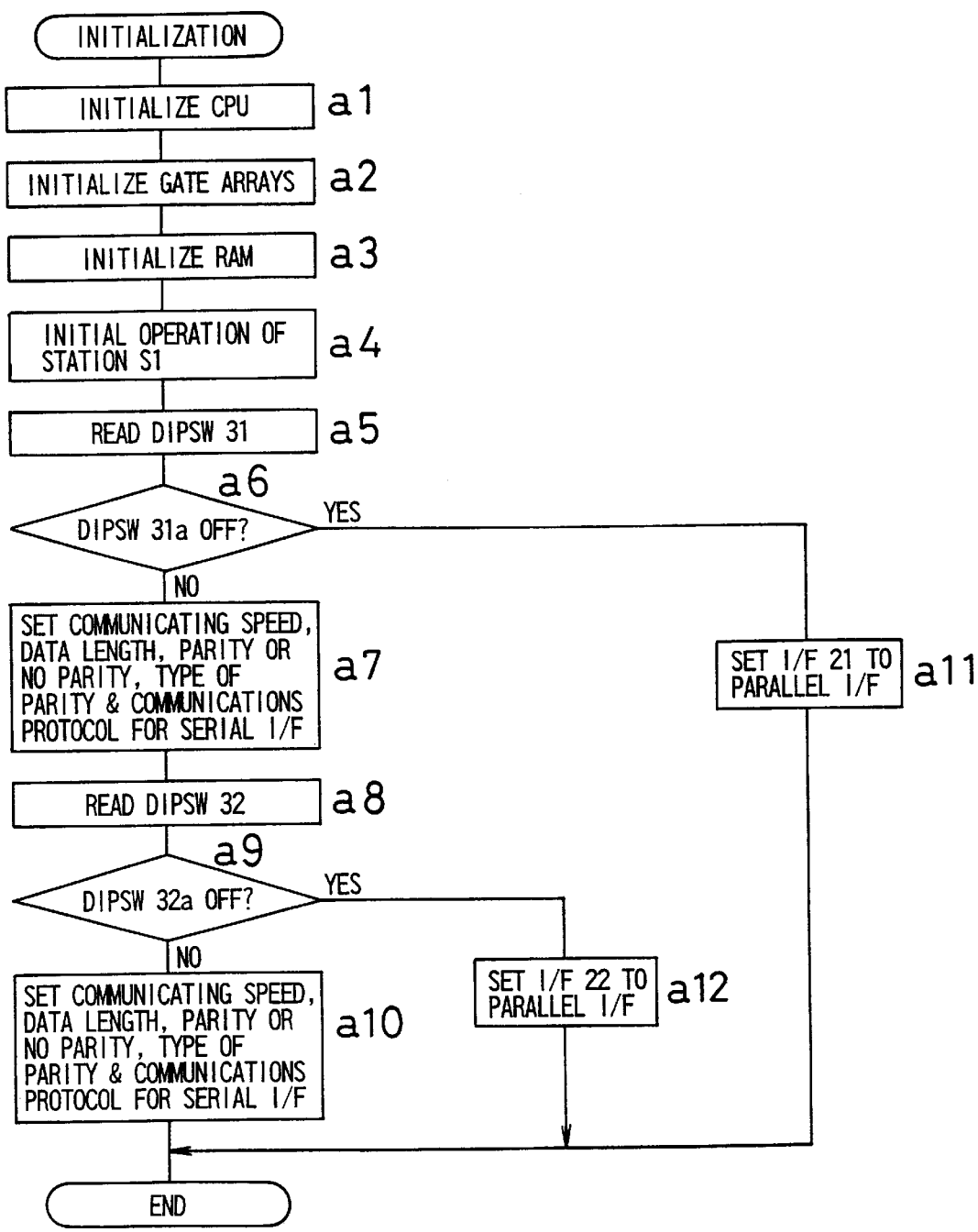
Figure 4:
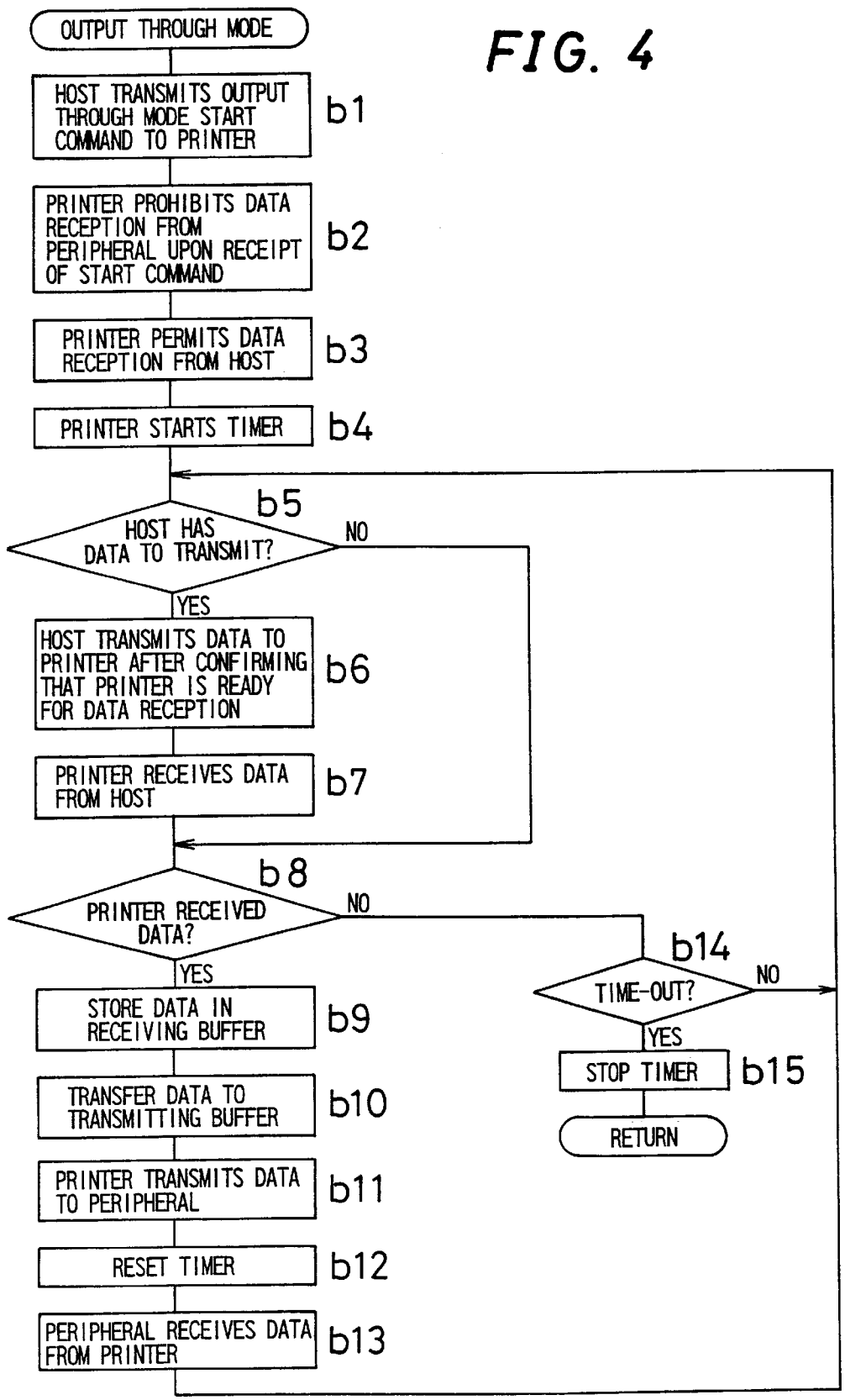
FIG. 4 is a flow chart of an output through mode.
Figure 5:
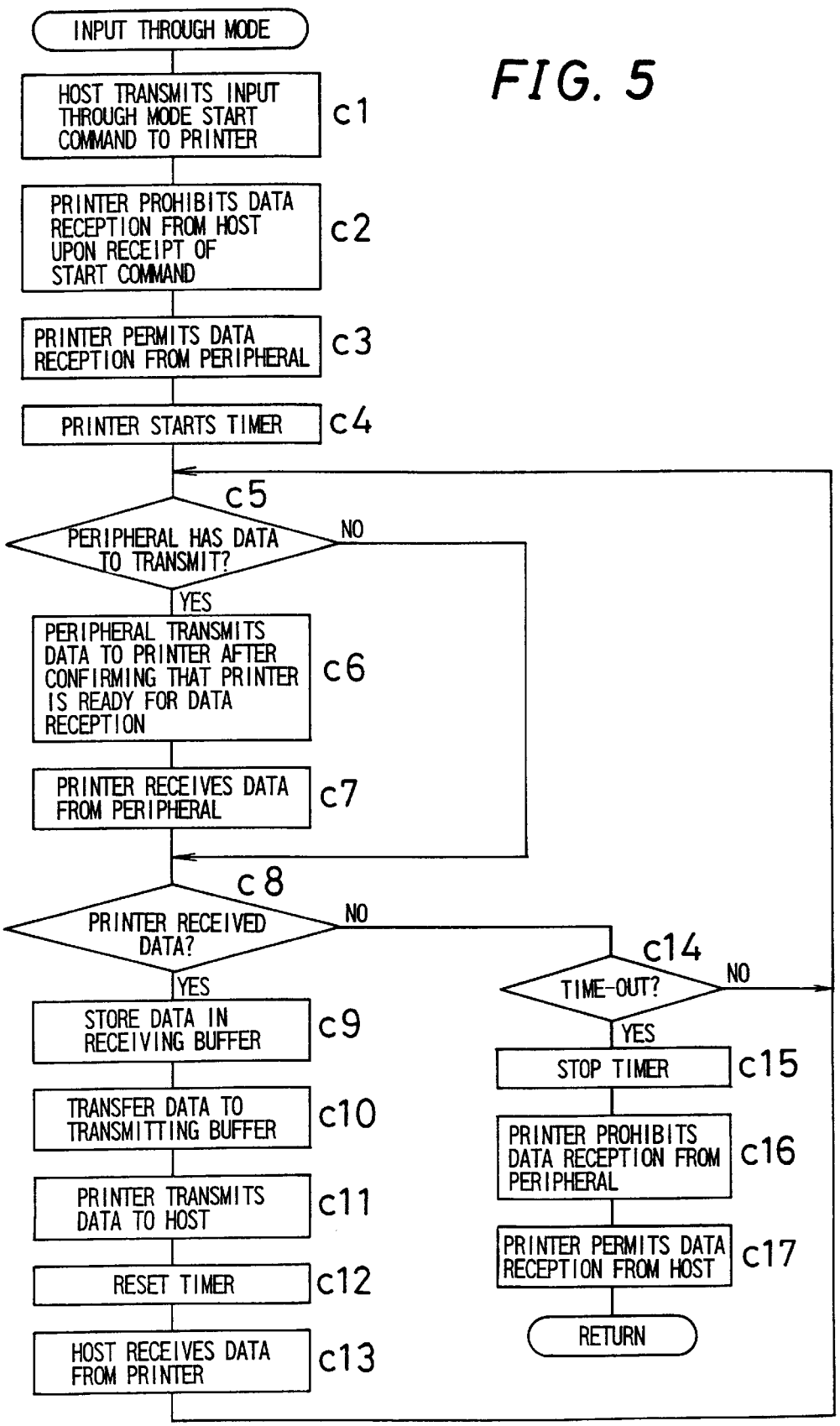
FIG. 5 is a flow chart of an input through mode.
Figure 6:
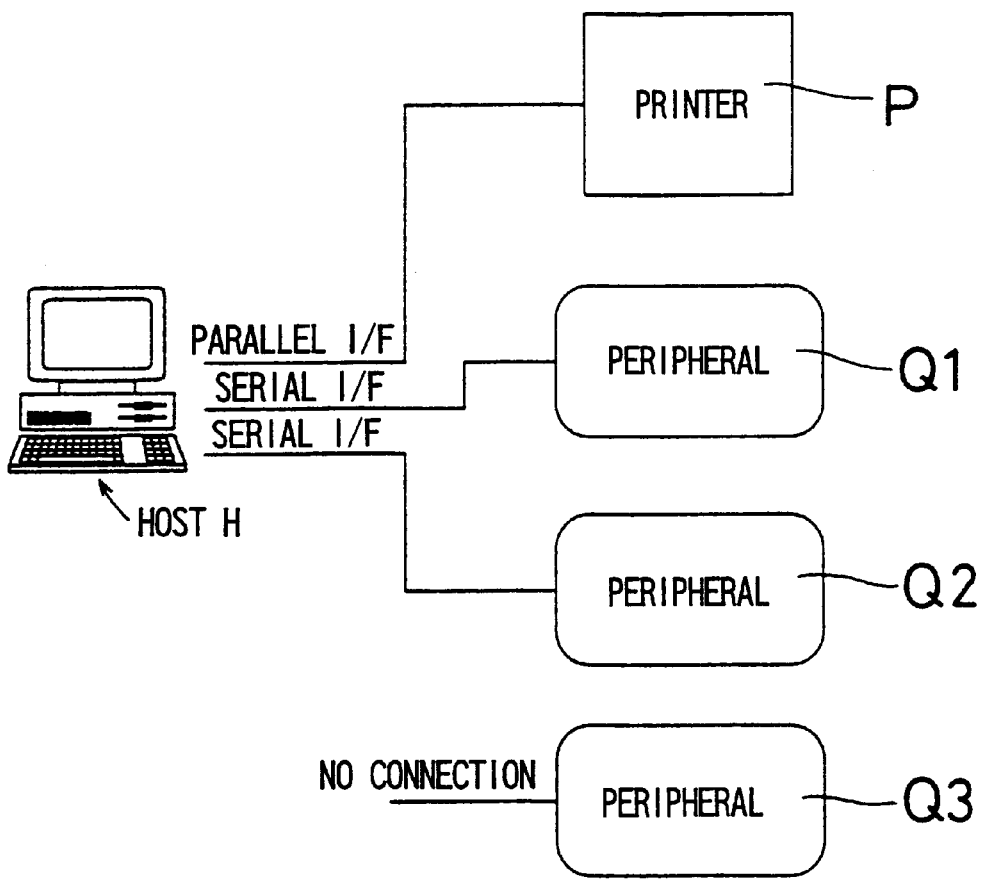
FIG. 6 is a block diagram showing one example of conventional POS systems.

FIGS. 3 through 5 are flow charts showing various operations. FIG. 3 shows an initializing process carried out after power is turned on. FIG. 4 shows the output through mode. FIG. 5 shows the input through mode. Referring first to FIG. 3, when the printer P is turned on, steps a1–a3 are executed to initialize the CPU 10, gate arrays (not shown) used as the interfaces 21 and 22, and the RAM 40. At step a4, the mechanism of station S1 is caused to carry out an initial operation. At step a5, the CPU 10 reads values set by the dip switches 31.

The dip switches 31 and 32 include a plurality of switches for setting various conditions. These conditions include whether the interfaces 21 and 22 are for serial communication or parallel communication. In the case of serial communication, a communicating speed is set (e.g. a selection is made from among 19,200 bps, 9,600 bps, 4,800 bps and 2,400 bps), as well as a communication data length (e.g. a selection is made between eight bits and seven bits), with or without parity checking, even number parity or odd number parity, and whether the communications protocol is the DTR/DSR mode using exclusive signal lines or the Xon/Xoff mode using exclusive data.

At step a6, the interface 21 is determined to be a serial interface when one switch 31a among the dip switches 31 is on. Then, the operation moves to step a7 to set operating conditions of the interface 21, based on settings by the dip switches 31, e.g. set communicating speed to 19,200 bps, communication data length to eight bits, parity checking valid and to the odd number parity, and communications protocol to the DTR/DSR mode.

Next, at step a8, the CPU 10 reads values set by the dip switches 32. At step a9, the interface 22 is determined to be a serial interface when one switch 32a among the dip switches 32 is on. Then, the operation moves to step a10 to set operating conditions of the interface 22, based on the settings by the dip switches 32, e.g. set communicating speed to 9,600 bps, communication data length to seven bits, parity checking invalid, and communications protocol to the DTR/DSR mode.

On the other hand, when the switch 31a is found to be off at step a6, the interface 21 is determined to be a parallel interface. Then, the operation moves to step a11 to set operating conditions of the interface 21 to those of a parallel interface, and ends the initializing process. Similarly, when the switch 32a is found to be off at step a9, the interface 22 is determined to be a parallel interface. Then, the operation moves to step a12 to set operating conditions of the interface 22 to those of a parallel interface, and ends the initializing process.

After the initializing process shown in FIG. 3, the printer P becomes ready and waits for a command from the external host H. When a print command is transmitted, a printing operation takes place at the station S1.

The output through mode will be described next. At step b1 in FIG. 4, the external host H transmits an output through mode start command to the printer P. Where the system includes a plurality of interfaces 22 and peripheral devices Q connected thereto, the external host H at this time can transmit an ID data identifying a destination as well.

Next, at step b2, the printer P, upon receipt of the output through mode start command, sets the DTR line and RTS line of the interface 22 in the side of the peripheral device Q to mark (high level) to prohibit data reception from the peripheral device Q. At step b3, the printer P sets the DTR line and RTS line of the interface 21 in the side of the external host H to space (low level) to permit data reception from the external host H.

Next, at step b4, a timer for time-out detection is started in order to discontinue the through mode processing when no data communication takes place for a predetermined time (e.g. 100 msec).

At step b5, it is judged whether the external host H has data to transmit or not. If there is data to be transmitted, the operation proceeds to step b6 at which the external host H transmits the data to the printer P via the interface 21 after confirming that the DTR line and RTS line of the interface 21 are set to space, i.e. the printer P is ready for data reception. Next, at step b7, the printer P starts an operation to receive the data from the external host H. When step b8 shows that the printer P has received the data, the CPU 10 temporarily stores this data in the receiving buffer 41 of RAM 40 at step b9. At step b10, the data is transferred from the receiving buffer 41 to the transmitting buffer 42. At step b11, the printer P transmits the data from the transmitting buffer 42 to the peripheral device Q via the interface 22. Subsequently, at step b12, the printer P resets the timer. After the peripheral device Q receives the data transmitted from the printer P at step b13, the operation returns to step b5 to process a next data communication.

On the other hand, when step b5 indicates that the external host H has no data to transmit, the operation jumps steps b6 and b7 and executes step b8 to check data reception by the printer P. When step b8 indicates that no data was received by the printer P, the operation proceeds to step b14 and stands by in the loop including steps b5 and b8 until expiration of the timer. When data is transmitted from the external host H during the standby, steps b9 to b13 are executed for the data transfer processing. When the timer expires with no data communication occurring for 100 msec or more, the timer is stopped at step b15 to terminate the output through mode.

As described above, data transmitted from the external host H may be forwarded to the peripheral device Q through the printer P.

The input through mode will be described next. At step c1 in FIG. 5, the external host H transmits an input through mode start command to the printer P. Where the system includes a plurality of interfaces 22 and peripheral devices Q connected thereto, the external host H at this time can transmit ID data identifying a data transmitting device as well.

Next, at step c2, the printer P, upon receipt of the input through mode start command, sets the DTR line and RTS line of the interface 21 in the side of the external host H to mark (high level) to prohibit data reception from the external host H. At step c3, the printer P sets the DTR line and RTS line of the interface 22 in the side of the peripheral device Q to space (low level) to permit data reception from the peripheral device Q.

Next, at step c4, the timer for time-out detection is started in order to discontinue the through mode processing when no data communication takes place for a predetermined time (e.g. 100 msec).

At step c5, it is judged whether the peripheral device Q has data to transmit or not. If there is data to be transmitted, the operation proceeds to step c6 at which the peripheral device Q transmits the data to the printer P via the interface 22 after confirming that the DTR line and RTS line of the interface 22 are set to space, i.e. the printer P is ready for data reception. Next, at step c7, the printer P starts an operation to receive the data from the peripheral device Q. When step c8 shows that the printer P has received the data, the CPU 10 temporarily stores this data in the receiving buffer 41 of RAM 40 at step c9. At step c10, the data is transferred from the receiving buffer 41 to the transmitting buffer 42. At step c11, the printer P transmits the data in the transmitting buffer 42 to the external host H via the interface 21. Subsequently, at step c12, the printer P resets the timer. After the external host H receives the data transmitted from the printer P at step c13, the operation returns to step c5 to process a next data communication.

On the other hand, when step c5 indicates that the peripheral device Q has no data to transmit, the operation jumps steps c6 and c7 and executes step c8 to check data reception by the printer P. When step c8 indicates that no data was received by the printer P, the operation proceeds to step c14 and stands by in the loop including steps c5 and c8 until expiration of the timer. When data is transmitted from the peripheral device Q during the standby, steps c9 to c13 are executed for the data transfer processing. When the timer expires with no data communication occurring for 100 msec or more, the timer is stopped at step c15. At step c16, the DTR line and RTS line of the interface 22 in the side of the peripheral device Q are set to mark, to prohibit data reception from the peripheral device Q. At step c17, the DTR line and RTS line of the interface 21 in the side of the external host H are set to space, to permit data reception from the external host H. Then, the input through mode is terminated.

As described above, data transmitted from the peripheral device Q may be forwarded to the external host H through the printer P.

The output through mode and input through mode have been described, exemplifying the interfaces 21 and 22 conforming to a serial interface standard. In the case of parallel interfaces, data communication may be effected by handshaking between bidirectional parallel interfaces conforming to the IEEE1284 standard.

POS peripheral devices in particular, with emphasis placed on small size and low cost, often employ serial interfaces requiring only small connectors. The data transfer function with a simple software protocol as in this embodiment has a high degree of general versatility for such devices. Moreover, even where the external host H is limited in the number of connection ports, an addition of simple commands allows connection of a larger number of devices (including a printer) than the number of connection ports, to promote expandability of the entire POS system.

The foregoing description exemplifies one interface 22 connected to the peripheral device Q. However, the system may include two or more interfaces 22 and two or more peripheral devices Q.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A printer comprising:

a first interface operable to exchange signals with an external host device;

a second interface operable to exchange signals with a peripheral device;

a printing station operable to print onto a recording medium based on print data supplied by the external host device; and a signal processing circuit having a print mode for printing the print data received from the external host device at said printing station, an output through mode for prohibiting receiving data from the peripheral device and for transmitting data received from the external host device via said first interface to the peripheral device via said second interface, and an input through mode for prohibiting receiving data from the external host device and for transmitting data received from the peripheral device via said second interface to the external host device via said first interface;

a receiving buffer operable to store data transmitted via each of said first interface and said second interface; and a transmitting buffer operable to store data transferred from said receiving buffer;

wherein said signal processing circuit enters one of the print mode, output through mode, and input through mode in response to a command from the external host device; and wherein when no data communication takes place for a predetermined time in the output through mode or in the input through mode, the mode is discontinued.

2. A printer comprising:

a first interface operable to exchange signals with an external host device;

a second interface operable to exchange signals with a peripheral device;

a printing station operable to print onto a recording medium based on print data supplied by the external host device;

a signal processing circuit having a print mode for printing the print data received from the external host device at said printing station, an output through mode for transmitting data received from the external host device via said first interface to the peripheral device via said second interface, and an input through mode for transmitting data received from the peripheral device via said second interface to the external host device via said first interface; and a switch provided for each of said first interface and said second interface in order to set communications protocol of said first interface and said second interface;

wherein said signal processing circuit enters one of the print mode, output through mode, and input through mode in response to a command from the external host device; and wherein in the output through mode and the input through mode, protocol conversion is carried out according to a setting of said switch provided for each of said first interface and said second interface so that data transmitted to one of said first interface and said second interface complies with a protocol of the other of said first interface and said second interface.

3. A printer as claimed in claim 1, wherein in the output through mode, data is transmitted to peripheral devices instructed by ID data for identifying a destination.

4. A printer as claimed in claim 2, wherein in the output through mode, data is transmitted to peripheral devices instructed by ID data for identifying a destination.

* * * * *